Aug. 24, 1954  M. H. DOUTHITT  2,687,443
CHEMICAL MANUFACTURE
Filed Jan. 25, 1952
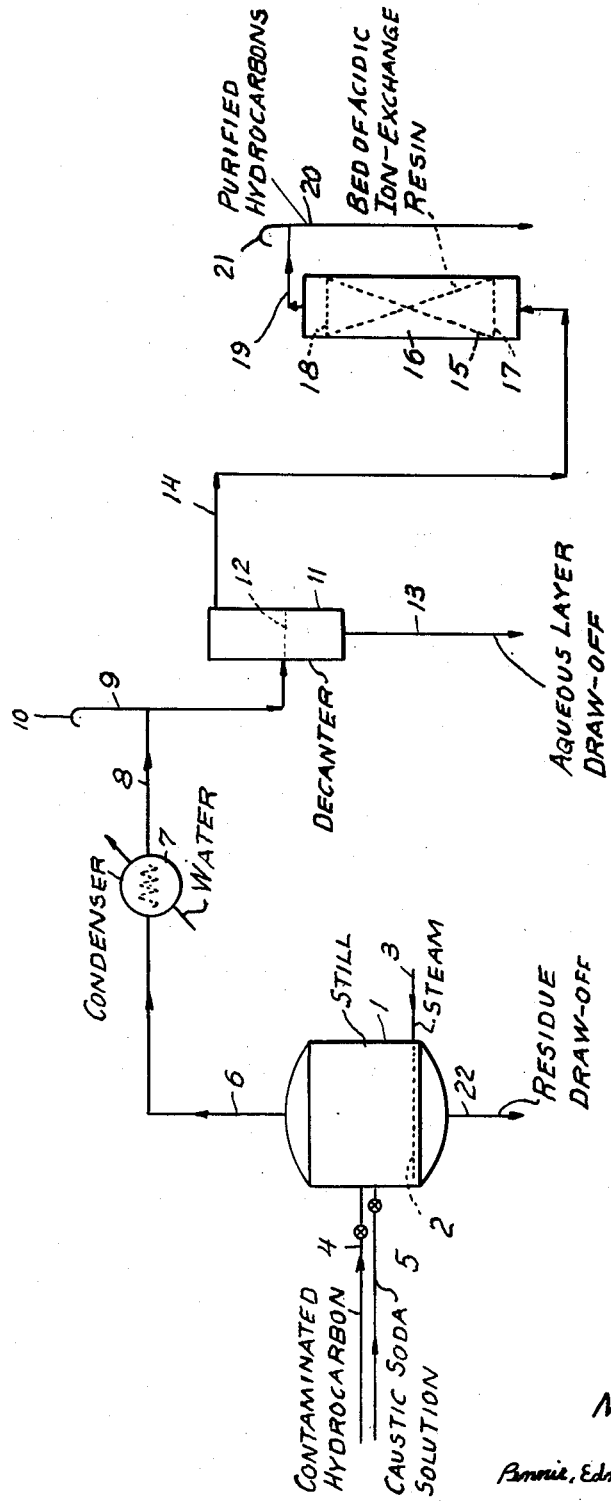
INVENTOR
MERTON H. DOUTHITT
BY
Pennie, Edmonds, Morton, Barrows & Taylor
ATTORNEYS Patented Aug. 24, 1954

2,687,443

UNITED STATES PATENT OFFICE 2,687,443

CHEMICAL MANUFACTURE

Merton H. Douthitt, Ossining, N. Y., assignor to National Distillers Products Corporation, New York, N. Y., a corporation of Virginia Application January 25, 1952, Serial No. 268,260

4 Claims. (Cl. 260—674)

This invention relates to the purification of volatile hydrocarbons, liquid at ordinary temperatures and pressures, and provides an improved process adapted to continuous operation whereby such hydrocarbons may be freed, or substantially freed, from organic contaminants frequently encountered therein.

The invention is especially effective as applied to the separation of volatile, water-insoluble organic bases or substituted organic bases, and compounds which decompose or react with aqueous caustic soda to form volatile, water-insoluble organic bases, and tars, from volatile normally liquid hydrocarbons contaminated therewith.

Hydrocarbons such as benzene, toluene, and xylene, for instance, are widely used as vehicles, solvents, filter washes, and the like, in organic chemical processes, notably in the manufacture of aniline derivatives of keto acids. In such uses, these hydrocarbons become contaminated with materials, such as the contaminants enumerated above, including aniline and aniline derivatives, and sometimes tars, lower ketones, lower alcohols and esters. Continued use of the hydrocarbons in the process is dependent upon the removal of all, or a substantial proportion, of such contaminants. The present invention provides a process by which that can be readily accomplished.

It has previously been proposed to purify these hydrocarbons by physical means, such as distillation or freezing, but such methods have proven unsatisfactory for the reason that they do not remove a sufficient portion of the contaminants to permit recycling, or reuse, of the hydrocarbons. Previous attempts to purify the hydrocarbons by chemical means have also been found unsatisfactory in that the procedure is complicated and difficult to control, is expensive to carry out and is highly corrosive. In such chemical treatment, it has been proposed to use mineral acids, which are highly corrosive, and this condition has been intensified by the high degree of agitation necessary to secure sufficient chemical action between the immiscible acid phase and the hydrocarbon phase to be purified.

These previously experienced difficulties are avoided by the method of my present invention, according to which the contaminated hydrocarbons are subjected to steam distillation in the presence of aqueous caustic soda, the vapors condensed and the condensate permitted to settle so as to form a hydrocarbon phase and an aqueous phase. The hydrocarbon layer is then separated from the aqueous layer and brought into intimate contact with a strongly acidic cation exchange resin. Any volatile ketones and lower alcohols present in the contaminated hydrocarbon, or formed as a result of the caustic distillation, are separated in the aqueous layer. Esters present are converted to non-volatile sodium salts by action of the aqueous caustic soda and remain in the still together with the tars. The contaminants remaining in the hydrocarbon layer are, for the most part, at least, volatile, water-insoluble organic bases, e. g., aniline or the like, and are separated from the hydrocarbon by attaching themselves to the resin.

Advantageously, the contaminated hydrocarbon and aqueous caustic soda solution are continuously charged to a still adapted to steam distillation and the mixture is continuously distilled by passing live or superheated steam to the still in contact with the liquid mixture. Mixed vapors, including water vapors and volatile constituents of the contaminated hydrocarbon, are continuously withdrawn from the still and condensed. Residue, which includes the tars and non-volatile salts, may be withdrawn from the still either continuously or intermittently, to avoid the accumulation of non-volatile material in the still. Advantageously, the rate of charge to, and withdrawal of vapors and residue from, the still are so coordinated as to maintain a substantially constant volume of liquid within the still. The condensate is either intermittently, or continuously passed to a decanting vessel from which the separated hydrocarbon layer is withdrawn and passed in contact with the cation exchange resin, as previously noted.

This latter step is, with advantage, effected by flowing a stream of the separated hydrocarbon layer slowly through a bed of the ion exchange resin of substantial thickness. If desired, the hydrocarbon which has been passed in contact with the ion exchange resin may be freed of water, as by a topping distillation, or other means known to the art, or the product may be fractionally distilled, if a further separation is desired. Because of the almost complete insolubility of water in aryl hydrocarbons, such as benzene, toluene and xylene, it is, in many cases, satisfactory to dispense with the final drying step.

The treating of the oil layer with the ion exchange resin, in accordance with my present invention, is, with advantage, carried out at atmospheric pressure though somewhat higher or lower pressures may be employed, where desired.

It is usually advantageous to carry out this step of the operation at or about room temperature, though the temperature is likewise subject to variation, provided, however, that the distillate being treated remains in a homogeneous liquid phase.

Any of the strongly acidic cation exchange resins, insoluble in the particular hydrocarbon, may be used for my purpose. I have, with particular advantage, used a synthetic, high density, nuclear sulfonic acid ion exchange resin, marketed under the trade name "Amberlite IR-120." Other cation exchange resins which may be used for my purpose, include, for instance, that marketed under the trade name "Amberlite IR-105."

The steam distillation of the contaminated hydrocarbon mixture is, with advantage, carried out at atmospheric pressure. However, either higher or lower pressure may be used, for instance, pressures within the range of 10 inches of mercury absolute pressure to 25 pounds per square inch gauge pressure.

In the separation of hydrocarbon mixtures containing substantial amounts of volatile, water-soluble contaminants, it may sometimes be desirable to subject the hydrocarbon from the steam distillation to water scrubbing to effect a more complete separation of such water-soluble contaminants. Also, it is sometimes advantageous to subject the vapors from the steam distillation to a fractionation to eliminate high boiling impurities, where present, prior to condensation.

The cationic exchange resin may be regenerated from time to time, as required, by well known methods, for instance, by treating the resin with a 1 to 2% aqueous solution of a mineral acid, followed by a water rinse. These regeneration methods constitute no part of the present invention and need not here be further described.

The several steps of my improved process are so coordinated as to effect a substantially complete removal of contaminants normally present in hydrocarbons as a result of their use as solvents, filter washes, and the like, in organic chemical processes of the type described, and cooperate to effect removal of such contaminants with a minimum of expense in operations steps, labor and equipment. Each step is so coordinated with succeeding steps as to condition the contaminants, or at least one or more of the contaminants usually present, for removal by the succeeding steps.

Thus, in the steam distillation step, the esters present are converted to non-volatile sodium salts and are discarded as residuum along with the tars, while aniline derivatives of keto acids are broken down to form aniline, ketones, alcohols and esters. Volatile water-soluble materials formed by the distillation step, including the ketones and alcohols, are separated by the decantation or the water washing of the vapors. And finally, the base materials, e. g., aniline and the like, formed by the distillation step, are separated from the hydrocarbon layer, previously freed from tars and the like, by the treatment with the ion exchange resin. The caustic treatment further serves to neutralize and prevent the volatilization of acid contaminants. The order in which these steps are carried out is, therefore, of primary importance.

The concentrations and proportions of caustic soda solution present in the steam distillation are likewise subject to considerable variation depending upon the identity and proportions of the particular contaminants present. Where there is present in the contaminated hydrocarbons a relatively large proportion of organic compounds to be reacted with the caustic soda, relatively greater proportions of caustic soda will be used. Advantageously, the caustic soda may be added as a 14.2° Baumé solution and in a proportion substantially in excess of that required to react with the contaminants, usually of the order of twice the required amount.

The invention will be further described and illustrated with reference to the accompanying drawing which represents conventionally and diagrammatically one type of apparatus especially adapted to the carrying out of the process.

In the drawing the steam still, represented by the numeral 1, is provided at its lower end with a steam distributing head indicated at 2, to which steam is introduced through line 3. Contaminated hydrocarbons are charged to the still through line 4 and caustic soda solution is introduced into the still through line 5. Vapors resulting from the steam distillation pass from the upper end of the still through vapor line 6 to condenser 7 and from thence the condensate and any uncondensed vapors and gases pass through line 8 to standpipe 9. From the upper end of the standpipe, uncondensed vapors and gases are vented into the atmosphere through vent 10 or otherwise disposed of.

The condensate passes downwardly through the standpipe to the settling and decanting vessel 11 wherein the condensate is separated by settling into an upper oil phase and a lower water phase, the interface between the two layers being indicated by the dotted line 12.

The aqueous phase is drawn off through line 13 and the oil phase continuously overflows from the decanting vessel through line 14 to an ion exchange resin column 15.

A bed 16 of cation exchange resin of the type described and of substantial height is supported within the column by a perforated support 17, the upper end of the resin bed being indicated by the dotted line 18. The oil phase of the condensate is caused to percolate slowly upwardly through the bed, either by gravity or applied pressure, for instance, by means of a pump, not shown, and passes from the upper end of the column through line 19 into standpipe 20, the purified hydrocarbon being withdrawn from the lower end of the standpipe and any gases or vapors withdrawn from the upper end of the standpipe and vented to the atmosphere by vent 21 or otherwise disposed of.

The steam still is provided at its lower end with a residue draw-off line 22 from which tar or other residual material may be withdrawn continuously or intermittently.

As previously noted, the purified hydrocarbon may be further treated in a conventional manner, as by a topping distillation, to remove any remaining water or may be recycled directly to the chemical process from which it was obtained or otherwise reused.

While only one ion exchange resin column is shown in the drawing it will be understood that a plurality of such columns may be provided connected in parallel so that one or more of the columns may be used as just described, while the resin bed in other columns is being regenerated.

The invention will be illustrated by the following specific example of its embodiment applied to the purification of contaminated m-xylene resulting from the use of the xylene in the manufacture of aniline derivatives of acetoacetic esters.

The xylene was contaminated by the presence of small amounts of aniline and of a variety of chemical compounds which decompose to form aniline, lower ketones, alcohols, esters, tars, and the like. The mixture was steam distilled in the presence of aqueous sodium hydroxide in an amount in excess of that required to react with the contaminants. The resultant distillate was permitted to settle and the xylene layer, separated by decantation, was found to contain aniline to the extent of 5,660 parts per million. A 1,000 cc. portion of this xylene layer was caused to trickle through a bed of the Amberlite IR-120 ion exchange resin particles, previously identified, the bed being 9 inches in height and 1⅜ inches in diameter, at a rate of 700 cc. per hour. The xylene passing from the lower end of the column was found to contain less than 10 parts per million of aniline and to be substantially free from the other contaminants present in the untreated contaminated xylene. A small amount of water present in the treated xylene was readily removed by topping distillation.

An advantage of my present process is the avoidance of the use of highly corrosive mineral acids in the treating of the contaminated hydrocarbons. As a result thereof, apparatus for carrying on the process may be constructed of common metals, such as copper or iron. As previously noted, a particular advantage of my process is that the steps preceding the removal of the volatile, water-insoluble organic bases substantially eliminate all of the other complicating contaminants initially present in the contaminated hydrocarbon or formed therein as decomposition or reaction product.

I claim:

1. A method for removing volatile, water-insoluble organic bases and substituted organic bases, compounds which react with aqueous caustic soda to form volatile water-insoluble organic bases and tars from volatile hydrocarbons, liquid at ordinary temperatures and pressures, contaminated therewith, comprising the steps of steam distilling the contaminated mixture in the presence of aqueous caustic soda, condensing the vapors, forming a non-aqueous layer and an aqueous layer by settling, separating the non-aqueous layer and passing it in contact with a strongly acidic cation exchange resin.

2. The process of claim 1 in which the resin is a synthetic, high density, nuclear sulfonic acid cation exchange resin.

3. The process of claim 1 in which the hydrocarbon is an aryl hydrocarbon.

4. The process of claim 1 in which the amount of aqueous caustic soda used in the steam distillation step is in excess of that required to react with the contaminants.

References Cited in the file of this patent

UNITED STATES PATENTS

| Number | Name | Date |
| --- | --- | --- |
| 1,654,581 | Cross | Jan. 3, 1928 |
| 2,367,803 | Schindler | Jan. 23, 1945 |
| 2,566,353 | Mills | Sept. 4, 1951 |